Aug. 10, 1926.
C. F. OLIVER
1,595,523
CONTROL MECHANISM
Filed Nov. 22, 1924
Fig. 1.
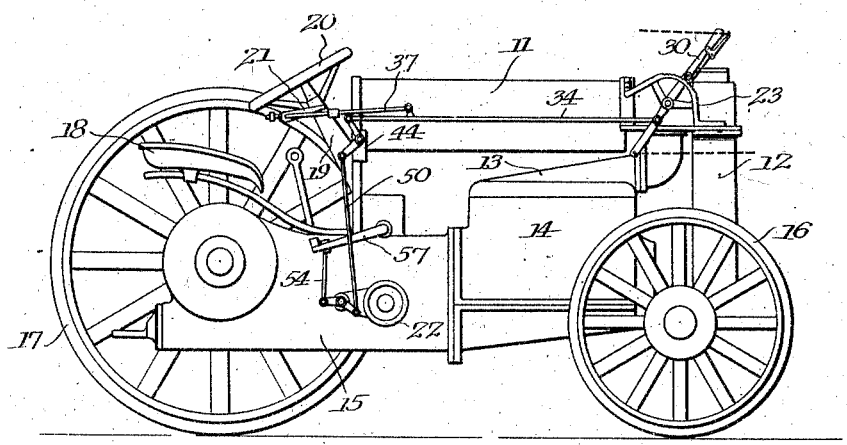
Fig. 2.
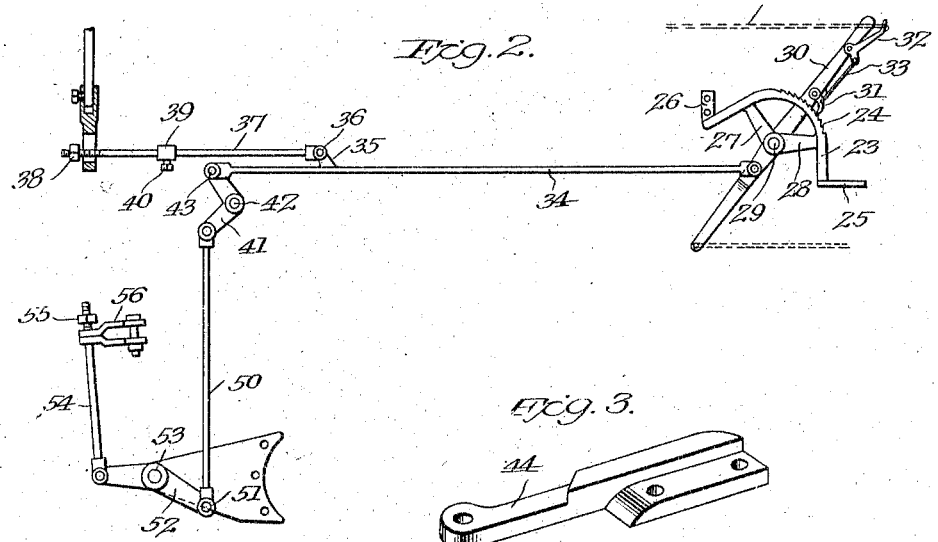
Fig. 3.
Inventor
Charles F. Oliver
By Joseph W. Hazell
Attorney Patented Aug. 10, 1926.

1,595,523

UNITED STATES PATENT OFFICE.

CHARLES F. OLIVER, OF PACES, VIRGINIA.

CONTROL MECHANISM.

Application filed November 22, 1924. Serial No. 751,521.

The present invention relates to tractors, and particularly to a control mechanism by which the operating belt pulley may be controlled.

One object of the invention is to provide a device of this class for association with a tractor by affixing it thereon without changing the tractor mechanism now usually provided.

Another object is to provide a device of this class by which the clutch of the tractor may be controlled.

Another object is to provide a device of this class by which the fuel control throttle may be controlled.

A further object of the invention is to provide such a device by which the clutch and fuel throttle may be conjointly controlled, and at a distance from the tractor.

A still further object of the invention is to provide such a device by which the fuel throttle may be controlled simultaneously with the clutch, and by which the fuel throttle may be advanced or retarded to any desired point automatically.

Other objects are to provide a device of this class which is simply constructed, inexpensive to manufacture, and easily and readily applied to tractors of known types.

Other objects and advantages of the invention will appear from the following description taken in connection with the accompanying drawings, which illustrate, by way of example, a preferred embodiment of the invention, but which are not to be taken as a definition of the limits of the invention, reference being had to the appended claims for that purpose.

In the drawings:—

Fig. 1 is a side elevation of a known form of tractor, showing the present invention applied thereto;

Fig. 2 is a side view in elevation, on an enlarged scale, showing the detached control mechanism.

Fig. 3 is a perspective view of an auxiliary mounting plate.

The tractor illustrated in Fig. 1 may be any one of a number of known types, and will not be described in detail. The fuel tank is represented at 11 and runs longitudinally of the tractor, which is provided with the front radiator 12, the intake manifold 13, the combustion engine 14, the exhaust 15, the front guiding wheels 16, and the rear traction wheels 17. The tractor is provided with a seat 18 for the operator and with a steering column 19, in which is mounted a steering post provided with the steering wheel 20. The usual hand fuel throttle is indicated at 21.

The tractor is provided with a side driving pulley 22, which when connected, usually by a belt, to any desired farm or other machinery, is customarily used as a driving or operating means therefor.

It often happens that the driven machine, or other device, is located at a distance from the tractor driving pulley and often requires the attention of an operator. In such cases it is usually necessary to have another operator or assistant stationed at the tractor in order to control the clutch and fuel supply. It is one of the principal objects of this invention to provide a device and mechanism by which the clutch and fuel supply at the tractor may be controlled conveniently and easily from a distance.

Accordingly, a quadrant 23, provided with notches 24 and fastening flanges 25 and 26, is secured to the frame of the tractor, preferably at the forward end thereof, in order that the clutch and fuel supply may be conveniently controlled from the forward end of the tractor when cranking the engine. The quadrant 23 is provided with integral radial bracing arms 27 and 28, upon which is mounted, by a shaft 29, the main controlling lever 30.

The main controlling lever 30, above its pivot 29, is provided preferably with a pawl 31 for engagement with the teeth 24, pawl 31 being controlled by any convenient form of lever 32, pivoted to the lever 30 and connected to the pawl by a rod 33. The lever 32 has preferably lying within it any convenient form of spring, for the purpose of urging the pawl 31 into engagement with the teeth 24.

The main controlling lever 30 extends below its pivot 29 and is pivotally connected at its lower end to a longitudinal rod 34, which is provided with a lug 35 brazed, welded, or otherwise secured thereto, and having its free end formed as a hook or with an opening to receive a pin 36. By the pin 36 is pivotally secured to said lug a throttle control arm 37, which passes through the hand fuel throttle control extension and is screw-threaded at its outer end to receive a nut 38, which prevents its disengagement from said throttle extension. Slidably mounted on the throttle control arm 37 is a collar 39, which may be fixed in any position on said arm by a set screw or bolt 40.

A bell crank arm 41 is pivoted to any convenient portion of the tractor or tractor frame at 42 and has one of its arms pivotally connected at 43 to the longitudinal rod 34. In some instances it is desirable to provide a plate 44, shown in Fig. 3 on an enlarged scale, which is fixed to the tractor body and to which is pivoted the bell crank 41.

The other end of the bell crank 41 has pivoted thereto the vertical rod 50, whose lower end is, in turn, pivotally connected at 51 to one arm of a second bell crank lever 52, which is pivoted at 53 to any convenient portion of the tractor.

The other end of the bell crank 52 is pivotally associated with the clutch control rod 54, which is screw-threaded at its upper end for the reception of a retaining nut 55.

Slidably mounted on the clutch control rod 54 is a clutch pedal receiving yoke or clamp 56, which is adapted to receive between its arms the clutch control pedal 57 of the tractor.

A rod, cable, rope, or other convenient means 60, may be conveniently attached to the pawl controlling lever 32 at its upper end and the rope or cable 60 may have its other end located in convenient proximity to the machinery or other device operated by the tractor driving pulley 22.

The operation of the device is as follows:

The collar 39 is first adjusted along the throttle control arm 37 to the desired position and is fixed thereon by the set screw 40, the object being to insure that the hand throttle 21 will always be returned to the same relative position when the tractor is started. If the engine has not been cranked, this may be done, and it will be noted that the main controlling lever 30 is within easy reach of the engine crank. Assuming now that the tractor driving pulley is belt-connected to a device to be operated, the operator by pulling the cable 60 toward the left, as seen in the drawings, will cause the throttle control rod 37 to move toward the right, carrying with it the fuel throttle 21, and thus decrease the supply of fuel and at the same time the vertical rod 50 will be raised through the bell crank 41, thus lowering the clutch control rod 54 through the bell crank 52 and thereby lowering and throwing out the clutch. The main controlling lever 30 is retained in this position by the pawl 31, which engages with the teeth 24 on the sector 23. When it is desired to increase the supply of fuel and let in the clutch in order to resume operations, the operator pulls the cable 60 toward the left, as shown in the drawings, and allows it to move slowly toward the right, in which direction it will be moved by the clutch pedal 57, which is actuated by the usual spring associated therewith. By not loosening the cable suddenly, the pawl 31 is retained out of engagement with the teeth 24, though where it is desired to retain the main controlling lever 30 in stopping position, it may be moved toward the left by the cable, which, if released suddenly, will allow the pawl 31 to engage with the teeth 24, thus holding the main operating lever 30 fixed in position.

It will be observed that the extent of movement of the hand throttle 21 toward the left, as shown in the drawings, will depend upon the position in which the collar 39 is fastened on the throttle controlling rod 37, and by fixing this collar in the desired position the operator will be assured that the throttle 21 will always be advanced the same desired amount, which may be increased or decreased according to the position of said collar on the rod 37.

It will be seen that by the foregoing construction there has been provided a tractor control mechanism which is simple and effective, which can be readily attached to a tractor, and by which the fuel supply and clutch may be simultaneously and co-operatively controlled by a single movement and at the tractor itself or at a desired distance therefrom.

What is claimed is:—

1. In a tractor having an engine, a driving pulley, a clutch and clutch pedal controlling said pulley and a fuel control throttle, means mounted on said tractor for controlling said clutch pedal, including a bell crank lever pivoted to said tractor, a clutch control rod having one end pivoted to said lever, and an actuating rod pivotally associated with said lever, means for controlling said fuel control throttle, including a second bell crank lever associated with the first, and means for controlling both of said means simultaneously, comprising a quadrant mounted on said tractor and a lever associated therewith.

2. In a tractor having an engine, a driving pulley, a clutch and clutch pedal controlling said pulley and a fuel control throttle, means mounted on said tractor for controlling said clutch pedal, means for controlling said fuel control throttle, comprising a throttle extension, an actuating rod and a throttle controlling rod pivotally associated therewith and having its other end slidably connected to said throttle extension, and means for controlling both of said means simultaneously.

3. In a tractor having an engine, a driving pulley, a clutch and clutch pedal controlling said pulley and a fuel control throttle, means mounted on said tractor for controlling said clutch pedal, means for controlling said fuel control throttle, and means for simutaneously controlling said clutch and moving said throttle to feed fuel to said engine at a predetermined rate, including an adjustable abutment for advancing said throttle.

4. In a tractor having an engine, a driving pulley, a clutch and a fuel control throttle, means mounted on said tractor for controlling said clutch and throttle simultaneously, said means including spaced apart throttle abutments, one on either side of said throttle, one of said abutments being adjustable toward and away from the other.

In testimony whereof I affix my signature.

CHARLES F. OLIVER.